US012592754B2

(12) United States Patent
Enescu

(10) Patent No.: US 12,592,754 B2
(45) Date of Patent: Mar. 31, 2026

(54) SPATIAL QUANTIZATION FOR SPHERICAL COVERAGE OF USER EQUIPMENT

(71) Applicant: Nokia Technologies Oy, Espoo (FI)

(72) Inventor: Mihai Enescu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 310 days.

(21) Appl. No.: 18/572,591

(22) PCT Filed: Jun. 30, 2021

(86) PCT No.: PCT/EP2021/068022
§ 371 (c)(1),
(2) Date: Dec. 20, 2023

(87) PCT Pub. No.: WO2023/274524
PCT Pub. Date: Jan. 5, 2023

(65) Prior Publication Data
US 2024/0297695 A1     Sep. 5, 2024

(51) Int. Cl.
*H04B 7/06* (2006.01)
*H04B 7/0426* (2017.01)

(52) U.S. Cl.
CPC ......... *H04B 7/0617* (2013.01); *H04B 7/0426* (2013.01)

(58) Field of Classification Search
CPC .... H04B 7/0617; H04B 7/0426; H04B 7/063; H04B 7/0848; H04B 7/06; H04B 7/08; H04B 17/30; H04W 52/42
See application file for complete search history.

(56) References Cited

U.S. PATENT DOCUMENTS

| | | | |
|---|---|---|---|
| 10,735,066 B2 | 8/2020 | Mo et al. | |
| 2014/0269414 A1* | 9/2014 | Hyde | H01Q 3/26 370/254 |

(Continued)

FOREIGN PATENT DOCUMENTS

| | | |
|---|---|---|
| WO | 2019/243449 A2 | 12/2019 |

OTHER PUBLICATIONS

"3rd Generation Partnership Project; Technical Specification Group Radio Access Network; General aspects for User Equipment (UE) Radio Frequency (RF) for NR (Release 16)", 3GPP TR 38.817-01, V16.2.0, Sep. 2020, pp. 1-102.

(Continued)

*Primary Examiner* — Mewale A Ambaye
(74) *Attorney, Agent, or Firm* — Nokia Technologies Oy

(57) ABSTRACT

The present disclosure relates generally to the field of wireless communications and, in particular, to techniques for spatially quantizing a spherical coverage of a user equipment (UE) and using the spatially quantized spherical coverage in beamforming at the UE and a network node in a wireless communication system. To this end, the UE transmits, to the network node, location information of the UE and antenna parameter measurements which are taken at least one time in at least one spatial section of the spatially quantized spherical coverage. The network node obtains a signal model based on the UE location information and the antenna parameter measurements. The signal model may be obtained by using a data processing algorithm, e.g., a machine learning algorithm. The signal model is indicative of how reference signals are to be transmitted from the network node to the UE. By so doing, it is possible to optimize the transmission of the reference signals from the network node to the UE, since the network node knows which of the spatial sectors of the spatially quantized (Continued)

S902 Receiving, from a network node, a spatial resolution to be used for a spherical coverage of an antenna of the UE, the spatial resolution being indicative of a set of spatial sectors into which the spherical coverage of the antenna is to be divided S904 Dividing the spherical coverage of the antenna into the set of spatial sectors S906 Measuring an antenna parameter at least one time in at least one spatial sector of the set of spatial sectors S908 Transmitting a response message comprising location information of the UE and the antenna parameter to the network node S910 Receiving a signal model from the network node, the signal model being indicative of how at least one reference signal is to be transmitted by the network node to the UE

900 spherical coverage of the UE is most suitable for their reception.

20 Claims, 11 Drawing Sheets

(56) References Cited

U.S. PATENT DOCUMENTS

| | | | | |
|---|---|---|---|---|
| 2015/0092875 A1* | 4/2015 | Kim | | H04W 72/21 |
| | | | | 375/267 |
| 2016/0330643 A1* | 11/2016 | Sahin | | H04W 16/14 |
| 2019/0364492 A1 | 11/2019 | Azizi et al. | | |
| 2020/0053800 A1 | 2/2020 | Deng et al. | | |
| 2021/0036421 A1* | 2/2021 | Ghassemzadeh | .... | H04B 7/0617 |
| 2024/0429617 A1* | 12/2024 | Pirollo | | H01Q 21/29 |
| 2025/0132826 A1* | 4/2025 | Medin | | H04B 7/18519 |
| 2025/0330832 A1* | 10/2025 | Medin | | H04W 16/28 |
| 2025/0337483 A1* | 10/2025 | Medin | | H04B 7/1855 |

OTHER PUBLICATIONS

Mo et al., "Beam Codebook Design for 5G mmWave Terminals", IEEE Access, vol. 7, Jul. 22, 2019, pp. 98387-98404.
"Email discussion summary for [96e][329] NR_MIMO_OTA", 3GPP TSG-RAN WG4 Meeting #96-e, R4-200xxxx, Agenda: 12.1, CAICT, Aug. 17-28, 2020, 18 pages.
Jiang et al., "Design of Joint Spatial and Power Domain Multiplexing Scheme for Massive MIMO Systems", International Journal of Antennas and Propagation, vol. 2015, pp. 1-10.
"IEEE 802.11", Wikipedia, Retrieved on Dec. 27, 2023, Webpage available at : https://en.wikipedia.org/wiki/IEEE_802.11.
International Search Report and Written Opinion received for corresponding Patent Cooperation Treaty Application No. PCT/EP2021/068022, dated Apr. 13, 2022, 13 pages.
Office action received for corresponding European Patent Application No. 21739068.1, dated Jan. 7, 2026, 6 pages.

* cited by examiner

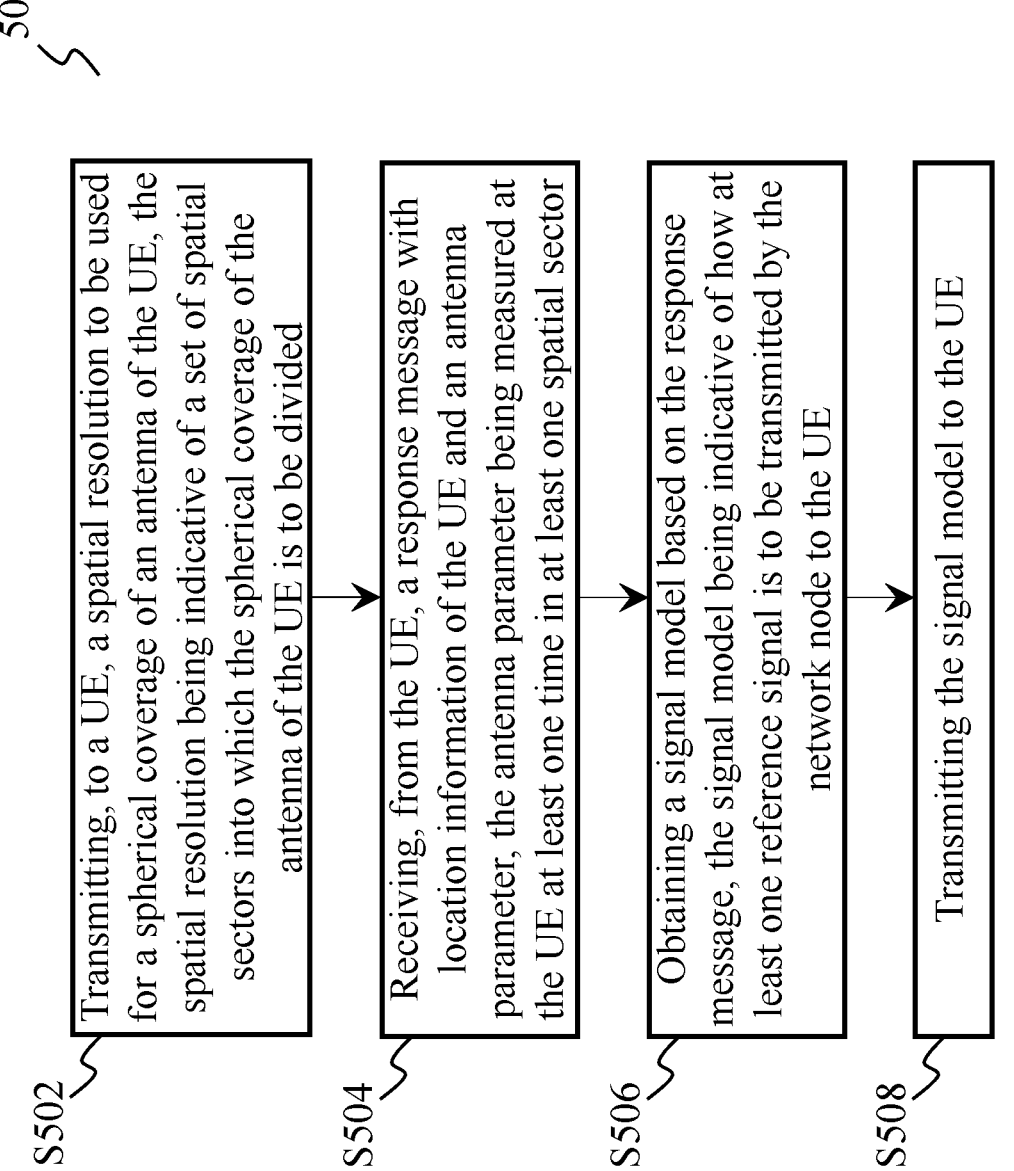

500

S502   Transmitting, to a UE, a spatial resolution to be used for a spherical coverage of an antenna of the UE, the spatial resolution being indicative of a set of spatial sectors into which the spherical coverage of the antenna of the UE is to be divided S504   Receiving, from the UE, a response message with location information of the UE and an antenna parameter, the antenna parameter being measured at the UE at least one time in at least one spatial sector S506   Obtaining a signal model based on the response message, the signal model being indicative of how at least one reference signal is to be transmitted by the network node to the UE S508   Transmitting the signal model to the UE

Instructions

Memory

802

Processor

806

Antenna

UE

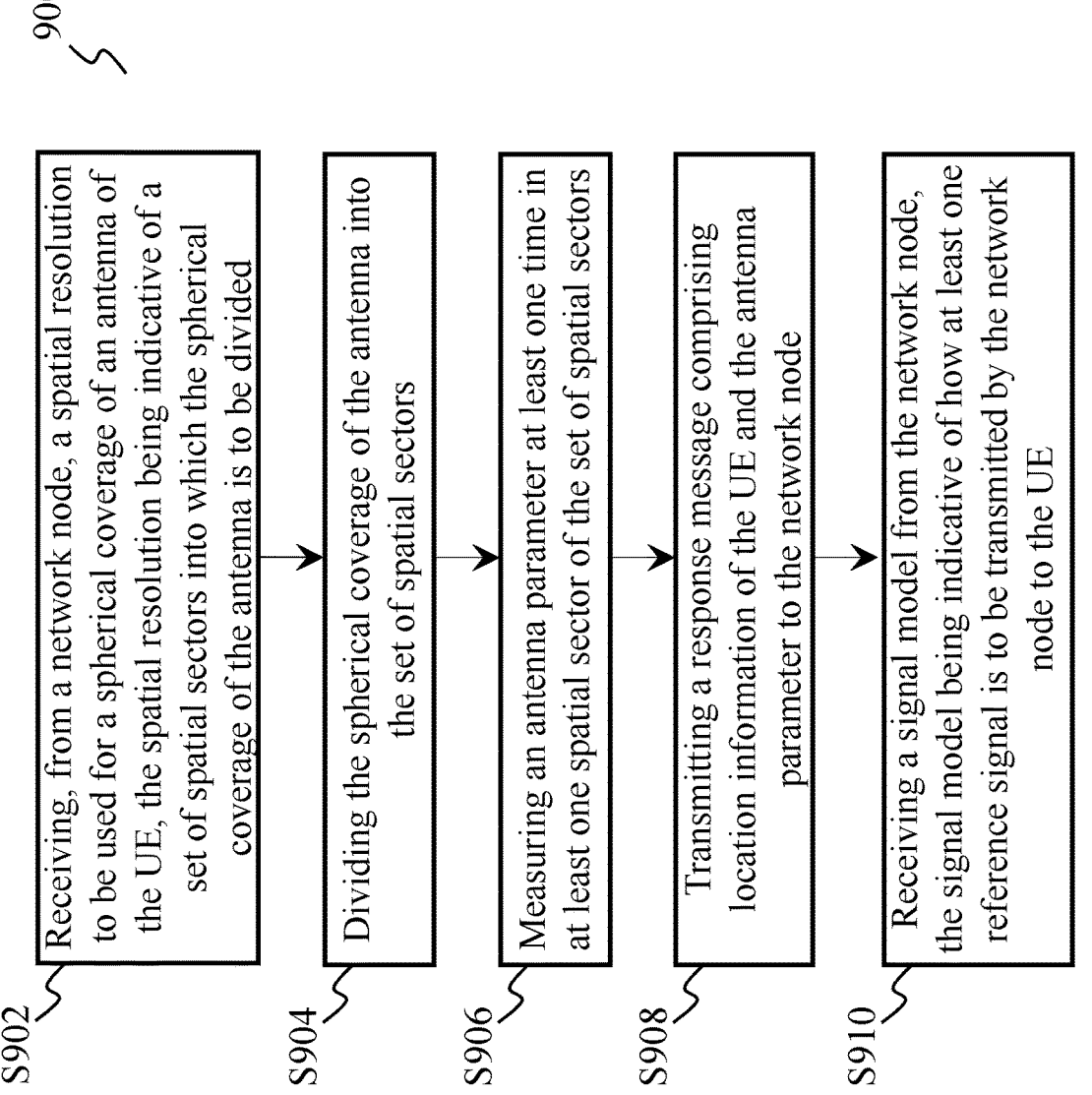

900

S902  Receiving, from a network node, a spatial resolution to be used for a spherical coverage of an antenna of the UE, the spatial resolution being indicative of a set of spatial sectors into which the spherical coverage of the antenna is to be divided S904  Dividing the spherical coverage of the antenna into the set of spatial sectors S906  Measuring an antenna parameter at least one time in at least one spatial sector of the set of spatial sectors S908  Transmitting a response message comprising location information of the UE and the antenna parameter to the network node S910  Receiving a signal model from the network node, the signal model being indicative of how at least one reference signal is to be transmitted by the network node to the UE

FIG. 9

SPATIAL QUANTIZATION FOR SPHERICAL COVERAGE OF USER EQUIPMENT

RELATED APPLICATION

This application was originally filed as PCT Application No. PCT/EP2021/068022, filed on Jun. 30, 2021, which is incorporated herein by reference in its entirety.

TECHNICAL FIELD

The present disclosure relates generally to the field of wireless communications and, in particular, to techniques for spatially quantizing a spherical coverage of a user equipment (UE) and using the spatially quantized spherical coverage in beamforming at the UE and a network node in a wireless communication system.

BACKGROUND

Millimeter-wave (mmWave) frequency bands are a promising candidate spectrum for the 5th generation (5G) mobile communication system, but it requires highly directional antenna arrays to be used in a base station (BS) and a user equipment (UE) to compensate for high pathloss. Since mobile wireless channels are random, the antenna arrays in the UE should own a large spherical coverage. As its name implies, this coverage may be considered as a sphere because signals may arrive (and be transmitted) virtually from (to) anywhere, and to some extent, due to the functionality of UE beamforming, the signals may be transmitted in any direction. The placement of the antenna arrays on the UE is a vendor specific problem. To be able to provide the spherical coverage, it is desired for the UE to have antenna arrays covering all directions in a 3D coordinate system.

Antenna parameters that are indicative of a power radiated towards a specific direction are also needed to characterize the spherical coverage of the UE. For example, an effective isotropic radiated power (EIRP) and an effective isotropic sensitivity (EIS) may be used for this purpose. The EIRP is used to find the best match for a transmit beam from the UE to the BS, while the EIS is used to establish the best receive beam of the UE. It has been found that the peak power of the receive beam is in the direction of the minimum EIS, while the peak power of the transmit beam is in the direction where the maximum EIRP is measured.

To facilitate the antenna parameter prediction and, consequently, the spherical coverage characterization of the mobile UE, it has been recently proposed to use machine learning (ML) or artificial intelligence (AI) algorithms. In general, the existing neural network (NN)-based solutions involve some form of training/learning based on antenna parameter measurements, and a NN algorithm itself may be performed on the receiving and/or transmitting sides. For example, the BS may learn a radio communication environment around the UE and construct a NN model/parametrization which is then transferred to the UE. The vice-versa may happen as well, including a situation when both the BS and the UE are part of the NN algorithm in the form of iterative operation/learning. Once the NN model is constructed and its outputs are available, a traditional type of radio signalling may happen between the BS and the UE, similar to what is currently specified in, for example, 5G, Long-Term Evolution (LTE)-based and other communication systems. Such operation is expected to happen with less signalling compared to the legacy (non-ML/AI-based) systems, relying on the learnings performed by the NN algorithm.

However, the existing solutions for the spherical coverage characterization of the UE may be inefficient in case of their use in beamforming scenarios. Even being supplemented with the ML/AI algorithms, these existing solutions are usually implemented ad hoc, for which reason they are not always applicable in the beamforming scenarios. The only knowledge used in these existing solutions is the information related to the transmission of reference signals from the BS to the mobile UE, while the reference signal measurements are performed at the mobile UE itself without using any prior information.

SUMMARY

This summary is provided to introduce a selection of concepts in a simplified form that are further described below in the detailed description. This summary is not intended to identify key features of the present disclosure, nor is it intended to be used to limit the scope of the present disclosure.

It is an objective of the present disclosure to provide a technical solution that enables spatial quantization for a spherical coverage of a UE and its utilization in beamforming for reference signals.

The objective above is achieved by the features of the independent claims in the appended claims. Further embodiments and examples are apparent from the dependent claims, the detailed description and the accompanying drawings.

According to a first aspect, a network node in a wireless communication network is provided. The network node comprises a processor, a memory coupled to the processor and configured to store processor-executable instructions, and a transceiver coupled to the processor. When executed, the processor-executable instructions cause the processor to operate as follows. At first, the processor causes the transceiver to transmit, to a UE, a spatial resolution to be used for a spherical coverage of an antenna of the UE. The spatial resolution is indicative of a set of spatial sectors into which the spherical coverage of the antenna of the UE is to be divided. Next, the processor causes the transceiver to receive, from the UE, a response message which comprises UE location information and an antenna parameter of the antenna of the UE. The antenna parameter is measured at least one time in at least one spatial sector of the set of spatial sectors. After that, the processor obtains a signal model based on the response message. The signal model is indicative of how at least one reference signal is to be transmitted by the transceiver to the UE. Next, the processor causes the transceiver to transmit the signal model to the UE. With this configuration, the network node according to the first aspect may provide the UE with prior information which may be then used by the UE for further antenna parameter measurements. Moreover, the signal model thus obtained requires less signalling compared to the existing solutions, while achieving same or even better performance. The transmission of reference signals from the network node according to the first aspect to the UE may be optimized when knowing more about the UE location and the spatial characterization or quantization of the UE spherical coverage (i.e. which of the spatial sectors is most suitable for signal reception).

In one example embodiment of the first aspect, the processor is further configured to define the spatial resolution based on a UE positioning accuracy used in the wireless communication network. By so doing, it is possible to define the most suitable spatial sectors in the spherical coverage of the UE.

In one example embodiment of the first aspect, the antenna parameter comprises at least one of an effective isotropic radiated power (EIRP), an effective isotropic sensitivity (EIS), a reference signal received power (RSRP), a power delay profile (PDP), an angle of arrival (AoA) estimation, a reference signal index, a channel state information (CSI) representation of a wireless communication channel established between the UE and the network node, and a signal interference noise ratio (SINR). These parameters may allow one to obtain the most efficient and accurate signal model.

In one example embodiment of the first aspect, the processor is further configured to cause the transceiver to transmit, to the UE, a request for updating the antenna parameter in at least one spatial sector of the set of spatial sectors, and to receive the updated antenna parameter from the UE. This may be useful, for example, when there are areas where no information is available at the network node, or sufficient information is available to the network node. To correctly schedule the UE measurements and feedback, the network node may indicate a way in which the UE needs to perform or not measurements in some geographical areas.

In one example embodiment of the first aspect, the processor is further configured to define a time unit (slot/subframe) within which the antenna parameter is to be measured, and cause the transceiver to transmit the time unit to the UE. By so doing, it is possible to reduce undesired signalling in the wireless communication network and, consequently, control UE power consumption.

In one example embodiment of the first aspect, the signal model is indicative of a geographical area in which the at least one reference signal is to be transmitted by the transceiver. This may provide operation flexibility to the network node according to the first aspect.

In another example embodiment of the first aspect, the signal model is indicative of a set of successive spatial positions of the UE along which the at least one reference signal is to be transmitted by the transceiver. This may provide operation flexibility to the network node according to the first aspect.

In yet another example embodiment of the first aspect, the at least one reference signal comprises a first reference signal and a second reference signal. In this embodiment, the signal model is indicative of: (i) a set of successive spatial positions of the UE along which the first reference signal is to be transmitted by the transceiver, and (ii) a geographical area in which the second reference signal is to be transmitted by the transceiver. This may provide operation flexibility to the network node according to the first aspect.

In one example embodiment of the first aspect, the processor is further configured to cause the transceiver to receive preliminary information from the UE. The preliminary information is indicative of a maximum number of spatial sectors into which the UE is configured to divide the spherical coverage of the antenna. In this embodiment, the processor is further configured to define the spatial resolution to be transmitted to the UE based on the preliminary information. By so doing, the network node according to the first aspect may properly define the spatial resolution for the UE.

In one example embodiment of the first aspect, the spatial resolution is further indicative of a condition for changing the set of spatial sectors depending on a geographical area where the UE is going to enter, and/or the spatial resolution is further indicative of a time period within which the set of spatial sectors is valid. By so doing, the network node according to the first aspect may properly control the spatial sectors to be used for the spherical coverage of the antenna of the UE.

In one example embodiment of the first aspect, the processor is configured to obtain the signal model based on the response message and a machine learning (ML) algorithm (e.g., a NN algorithm). By using the ML algorithm, it is possible to obtain a more suitable and accurate signal model for the UE.

According to a second aspect, a UE for wireless communications is provided. The UE comprises a processor, a memory coupled to the processor and configured to store processor-executable instructions, and an antenna coupled to the processor and configured to provide a spherical coverage around the UE. When executed, the processor-executable instructions cause the processor to operate as follows. At first, the processor causes the antenna to receive, from a network node, a spatial resolution to be used for the spherical coverage of the antenna. The spatial resolution is indicative of a set of spatial sectors into which the spherical coverage of the antenna is to be divided. Next, the processor divides the spherical coverage of the antenna into the set of spatial sectors. After that, the processor measures an antenna parameter of the antenna at least one time in at least one spatial sector of the set of spatial sectors. Further, the processor causes the antenna to transmit a response message to the network node. The response message comprises UE location information and the antenna parameter to the network node, and, in response, to receive a signal model from the network node. The signal model is indicative of how at least one reference signal is to be transmitted by the network node to the UE. With this configuration, the UE according to the second aspect may optimize the reception of reference signals and its further operation from the perspective of power consumption, signalling, and beamforming.

In one example embodiment of the second aspect, the antenna parameter comprises at least one of an EIRP, an EIS, a RSRP, a PDP, an AoA estimation, a reference signal index, a CSI representation of a wireless communication channel established between the UE and the network node, and a SINR. These parameters may allow one to obtain the most efficient and accurate signal model.

In one example embodiment of the second aspect, the processor is further configured to cause the antenna to receive, from the network node, a request for updating the antenna parameter in one or more spatial sectors of the set of spatial sectors. In response to the request, the processor is further configured to update the antenna parameter in the one or more spatial sectors and cause the antenna to transmit the updated antenna parameter to the network node. By using such a request, the UE according to the second aspect may correctly schedule its measurements and feedback.

In one example embodiment of the second aspect, the processor is further configured to cause the antenna to receive, from the network node, a time unit within which the antenna parameter is to be measured. This may also allow the UE according to the second aspect to correctly schedule its measurements and feedback. Moreover, knowing when the measurements are to be taken, the UE may reduce its signalling in the wireless communication network and, consequently, its power consumption.

In one example embodiment of the second aspect, the signal model is indicative of a geographical area in which the at least one reference signal is to be transmitted by the network node. This may provide operation flexibility to the UE according to the second aspect.

In another example embodiment of the second aspect, the signal model is indicative of a set of successive spatial positions of the UE along which the at least one reference signal is to be transmitted by the network node. This may provide operation flexibility to the UE according to the second aspect.

In yet another example embodiment of the second aspect, the at least one reference signal comprises a first reference signal and a second reference signal. In this embodiment, the signal model is indicative of: (i) a set of successive spatial positions of the UE along which the first reference signal is to be transmitted by the network node, and (ii) a geographical area in which the second reference signal is to be transmitted by the transceiver. This may provide operation flexibility to the UE according to the second aspect.

In one example embodiment of the second aspect, the processor is further configured to cause the antenna to transmit preliminary information to the network node. The preliminary information is indicative of a maximum number of spatial sectors into which the UE is configured to divide the spherical coverage of the antenna. By so doing, the UE according to the second aspect may inform the network node about its spatial quantization capabilities, so that the network node may properly define the spatial resolution for the UE.

In one example embodiment of the second aspect, the spatial resolution is further indicative of a condition for changing the set of spatial sectors depending on a geographical area where the UE is going to enter, and/or the spatial resolution is further indicative of a time period within which the set of spatial sectors is valid. By so doing, the UE may be informed of all changes to be made with respect to the spatial sectors, so that the UE may use proper spatial sectors in a certain geographical area and/or at a certain time moment.

According to a third aspect, a method for operating a network node in a wireless communication network is provided. The method starts with the step of transmitting, to a UE, a spatial resolution to be used for a spherical coverage of an antenna of the UE. The spatial resolution is indicative of a set of spatial sectors into which the spherical coverage of the antenna of the UE is to be divided. Next, the method proceeds to the step of receiving, from the UE, a response message which comprises UE location information and an antenna parameter of the antenna of the UE. The antenna parameter is measured at least one time in at least one spatial sector of the set of spatial sectors. Further, the method goes on to the step of obtaining a signal model based on the response message. The signal model is indicative of how at least one reference signal is to be transmitted by the network node to the UE. After that, the method proceeds to the step of transmitting the signal model to the UE. By so doing, it is possible to provide the UE with prior information which may be then used by the UE for further antenna parameter measurements. Moreover, the signal model is obtained by using less signalling compared to the existing solutions, while achieving same or even better performance. The transmission of reference signals from the network node to the UE may be optimized when knowing more about the UE location and the spatial characterization or quantization of the UE spherical coverage (i.e. which of the spatial sectors is most suitable for signal reception).

According to a fourth aspect, a method for operating a UE for wireless communications is provided. The method starts with the step of receiving, from a network node, a spatial resolution to be used for a spherical coverage of an antenna of the UE. The spatial resolution is indicative of a set of spatial sectors into which the spherical coverage of the antenna is to be divided. Next, the method proceeds to the step of dividing the spherical coverage of the antenna into the set of spatial sectors. Further, the method goes on to the step of measuring an antenna parameter of the antenna at least one time in at least one spatial sector of the set of spatial sectors. After that, the method proceeds to the steps of transmitting a response message to the network node. The response message comprises UE location information and the antenna parameter. Then, the method proceeds to the step of receiving a signal model from the network node. The signal model is indicative of how at least one reference signal is to be transmitted by the network node to the UE. By so doing, it is possible to optimize the reception of reference signals at the UE and its further operation from the perspective of power consumption, signalling, beamforming, etc.

According to a fifth aspect, a computer program product is provided. The computer program product comprises a computer-readable storage medium that stores a computer code. Being executed by at least one processor, the computer code causes the at least one processor to perform the method according to the third aspect. By using such a computer program product, it is possible to simplify the implementation of the method according to the third aspect in any network node, like the network node according to the first aspect.

According to a sixth aspect, a computer program product is provided. The computer program product comprises a computer-readable storage medium that stores a computer code. Being executed by at least one processor, the computer code causes the at least one processor to perform the method according to the fourth aspect. By using such a computer program product, it is possible to simplify the implementation of the method according to the fourth aspect in any user device, like the UE according to the second aspect.

According to a seventh aspect, a network node in a wireless communication network is provided. The network node comprises a first means for transmitting, to a UE, a spatial resolution to be used for a spherical coverage of an antenna of the UE. The spatial resolution is indicative of a set of spatial sectors into which the spherical coverage of the antenna of the UE is to be divided. The network node further comprises a means for receiving, from the UE, a response message which comprises UE location information and an antenna parameter of the antenna of the UE. The antenna parameter is measured at least one time in at least one spatial sector of the set of spatial sectors. The network node further comprises a means for obtaining a signal model based on the response message. The signal model is indicative of how at least one reference signal is to be transmitted by the transceiver to the UE. The network node further comprises a second means for transmitting the signal model to the UE. With this configuration, the network node according to the seventh aspect is able to provide the UE with prior information which may be then used by the UE for further antenna parameter measurements. Moreover, the signal model is obtained by using less signalling compared to the existing solutions, while achieving same or even better performance. The transmission of reference signals from the network node according to the seventh aspect to the UE may be optimized when knowing more about the UE location and the spatial characterization or quantization of the UE spherical coverage (i.e. which of the spatial sectors is most suitable for signal reception).

According to an eighth aspect, a UE for wireless communications is provided. The UE comprises a first means for receiving, from a network node, a spatial resolution to be used for the spherical coverage of the antenna. The spatial resolution is indicative of a set of spatial sectors into which the spherical coverage of the antenna is to be divided. The UE further comprises a means for dividing the spherical coverage of the antenna into the set of spatial sectors. The UE further comprises a means for measuring an antenna parameter of the antenna at least one time in at least one spatial sector of the set of spatial sectors. The UE further comprises a means for transmitting a response message to the network node. The response message comprises UE location information and the antenna parameter. The UE further comprises a second means for receiving a signal model from the network node. The signal model is indicative of how at least one reference signal is to be transmitted by the network node to the UE. With this configuration, the UE according to the eighth aspect may optimize the reception of reference signals and its further operation from the perspective of power consumption, signalling, beamforming, etc.

Other features and advantages of the present disclosure will be apparent upon reading the following detailed description and reviewing the accompanying drawings.

BRIEF DESCRIPTION OF THE DRAWINGS

The present disclosure is explained below with reference to the accompanying drawings in which:

FIG. 5 shows a flowchart of a method for operating the network node shown in FIG. 4 in accordance with one example embodiment;

FIG. 9 shows a flowchart of a method for operating the UE shown in FIG. 8 in accordance with one example embodiment;

DETAILED DESCRIPTION

Figure 1:
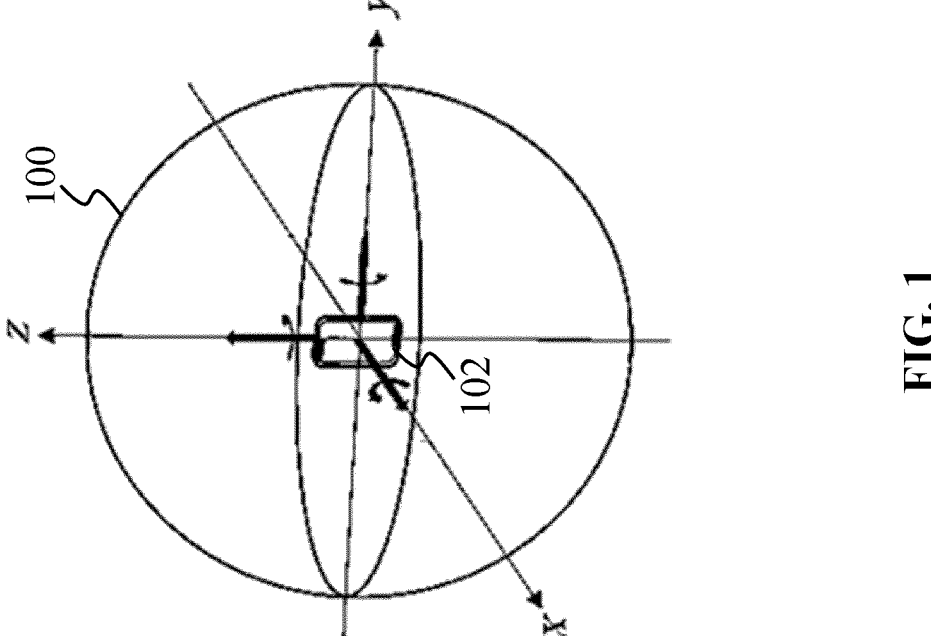
FIG. 1 schematically shows a spherical coverage of a UE in accordance with the prior art.

Various embodiments of the present disclosure are further described in more detail with reference to the accompanying drawings. However, the present disclosure can be embodied in many other forms and should not be construed as limited to any certain structure or function discussed in the following description. In contrast, these embodiments are provided to make the description of the present disclosure detailed and complete.

According to the detailed description, it will be apparent to the ones skilled in the art that the scope of the present disclosure encompasses any embodiment thereof, which is disclosed herein, irrespective of whether this embodiment is implemented independently or in concert with any other embodiment of the present disclosure. For example, the apparatuses and methods disclosed herein can be implemented in practice by using any numbers of the embodiments provided herein. Furthermore, it should be understood that any embodiment of the present disclosure can be implemented using one or more of the elements presented in the appended claims.

Unless otherwise stated, any embodiment recited herein as "example embodiment" should not be construed as preferable or having an advantage over other embodiments.

According to the example embodiments disclosed herein, a user equipment or UE for short may refer to a mobile device, a mobile station, a mobile terminal, a mobile subscriber unit, a mobile phone, a cellular phone, a smart phone, a cordless phone, a personal digital assistant (PDA), a wireless communication device, a laptop computer, a tablet computer, a gaming device, a netbook, a smartbook, an ultrabook, a medical device or medical equipment, a biometric sensor, a wearable device (e.g., a smart watch, smart glasses, a smart wrist band, etc.), an entertainment device (e.g., an audio player, a video player, etc.), a vehicular component or sensor (e.g., a driver-assistance system), a smart meter/sensor, an unmanned vehicle (e.g., an industrial robot, a quadcopter, etc.) and its component (e.g., a self-driving car computer), industrial manufacturing equipment, a global positioning system (GPS) device, an Internet-of-Things (IoT) device, an Industrial IoT (IIoT) device, a machine-type communication (MTC) device, a group of Massive IoT (MIoT) or Massive MTC (mMTC) devices/sensors, an extended reality (XR)/virtual reality (VR) device or any other suitable mobile device configured to support wireless communications. In some embodiments, the UE may refer to at least two collocated and inter-connected UEs thus defined.

As used in the example embodiments disclosed herein, a network node may relate to a fixed point of communication for the UE in a particular wireless communication network. The network node may be referred to as a base transceiver station (BTS) in terms of the 2G communication technology, a NodeB in terms of the 3G communication technology, an evolved NodeB (eNodeB) in terms of the 4G communication technology, and a gNB in terms of the 5G New Radio (NR) communication technology. The network node may serve different cells, such as a macrocell, a microcell, a picocell, a femtocell, and/or other types of cells. The macrocell may cover a relatively large geographic area (for example, at least several kilometers in radius). The microcell may cover a geographic area less than two kilometers in radius, for example. The picocell may cover a relatively small geographic area, such, for example, as offices, shopping malls, train stations, stock exchanges, etc. The femtocell may cover an even smaller geographic area (for example, a home). Correspondingly, the network node serving the macrocell may be referred to as a macro node, the network node serving the microcell may be referred to as a micro node, and so on.

According to the example embodiments disclosed herein, a wireless communication network, in which the UE and the network node communicate with each other, may refer to a cellular or mobile network, a Wireless Local Area Network (WLAN), a Wireless Personal Area Networks (WPAN), a Wireless Wide Area Network (WWAN), a satellite communication (SATCOM) system, or any other type of wireless communication networks. Each of these types of wireless communication networks supports wireless communications according to one or more communication protocol standards. For example, the cellular network may operate according to the Global System for Mobile Communications (GSM) standard, the Code-Division Multiple Access (CDMA) standard, the Wide-Band Code-Division Multiple Access (WCDM) standard, the Time-Division Multiple Access (TDMA) standard, or any other communication protocol standard, the WLAN may operate according to one or more versions of the IEEE 802.11 standards, the WPAN may operate according to the Infrared Data Association (IrDA), Wireless USB, Bluetooth, or ZigBee standard, and the WWAN may operate according to the Worldwide Interoperability for Microwave Access (WiMAX) standard.

As different wireless communication networks are used more and more, and more and more services are provided over these networks, there is an increasing need for a wireless communication network with larger capacity, higher throughput, lower latency, and better reliability. One way to provide such a wireless communication network is to use millimeter waves in wireless communications. The millimeter waves (mmWaves) are radio waves with a wavelength in the range of 1 mm to 10 mm, which corresponds to a radio frequency of 30 GHz to 300 GHz. These radio waves exhibit unique propagation characteristics. For example, compared with lower frequency radio waves, the mmWaves suffer higher propagation loss, have a poorer ability to penetrate objects, such as buildings, walls, and are more susceptible to atmosphere absorption, deflection and diffraction due to particles (e.g., rain drops) in the air. On the other hand, due to the smaller wave lengths of the mmWaves, more antennas may be packed in a relatively small area, thereby allowing for the implementation of a high-gain antenna (also known as a highly directional antenna) in small form factor. In addition, due to the above-mentioned disadvantages, the mmWaves have been less utilized than the lower frequency radio waves.

Relative to the mmWaves, one of the main problems posed by the 3rd Generation Partnership Project (3GPP) consists in the spatial characterization and operation of a UE. More specifically, the so-called spherical coverage of the UE (i.e. the coverage of its antenna array(s)) has been introduced, which describes the ability of the UE to receive and transmit signals in a spatial domain in all direction in a 3D coordinate system. In other words, the spherical coverage may be considered as a range of angles that the UE may cover.

FIG. 1 schematically shows a spherical coverage 100 of a UE 102 in accordance with the prior art. As implied by the spherical coverage 100, the UE 102 may receive and transmit wireless communication signals (e.g., reference signals, data signals, controls signals, etc.) in all directions. Since the UE 102 is highly likely to experience 3D rotation (see the arrows in FIG. 1), it is important to characterise its coverage (i.e. a communication environment around the UE 102) in a 3D coordinate system (see axes X, Y, and Z in FIG. 1) where the UE 102 could experience rotations across any of the three directions.

Figure 2:
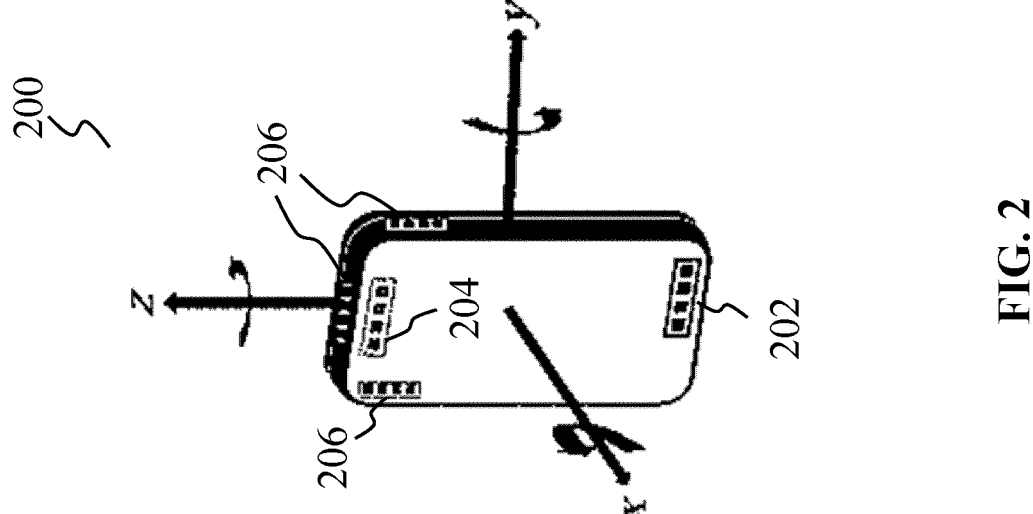
FIG. 2 shows schematic antenna arrangements in a UE in accordance with the prior art.

FIG. 2 shows schematic antenna arrangements in a UE 200 in accordance with the prior art. As noted earlier, the arrangement of antenna arrays on the UE 200 is a vendor specific problem. However, to provide a spherical coverage like the spherical coverage 100 shown in FIG. 1, the UE 200 needs to have antenna arrays covering all 3D directions. As show in FIG. 2, the UE 200 comprises a front antenna array

202, a rear antenna array 204, and three side antenna arrays 206. The combination of these antenna arrays may provide the spherical coverage of the UE 200. The way in which the UE 200 (as well as a network node which communicates with the UE 200) uses beam widths to perform beamformed transmission/reception depends on particular applications. It is however understood that the peak power of a UE receive beam is in the direction of a minimum EIS, which is found by performing a 3D scan in the spherical coverage.

Figure 3B:
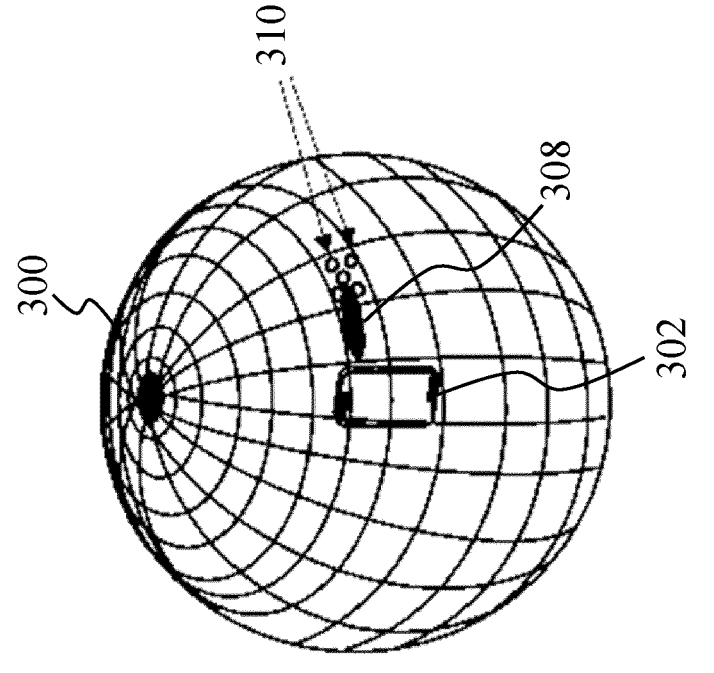
FIGS. 3A and 3B schematically explain how to perform a 3D scan in the UE spherical coverage in accordance with the prior art.
Figure 3A:
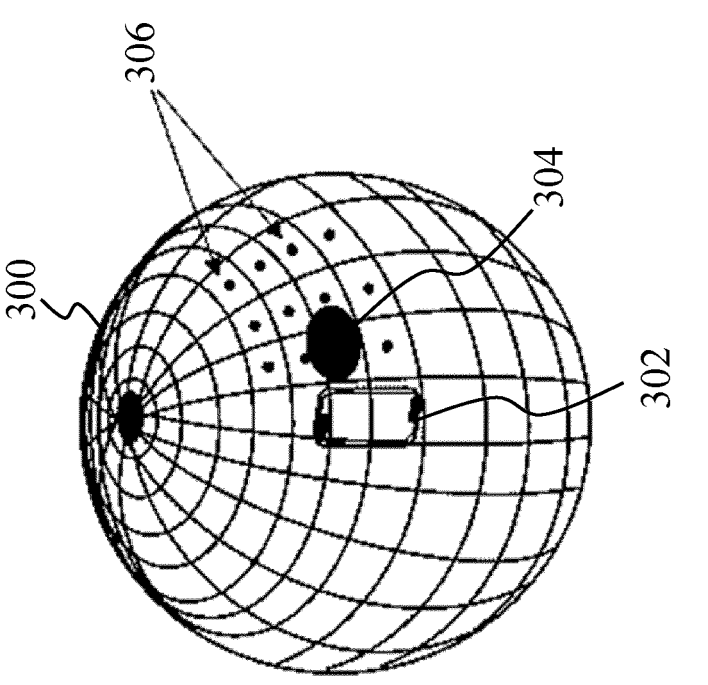

FIGS. 3A and 3B schematically explain how to perform a 3D scan in the UE spherical coverage in accordance with the prior art. More specifically, each of FIGS. 3A and 3B shows a 3D sphere 300 with a search grid, and a UE 300 arranged in the centre of the 3D sphere 300. In FIG. 3A, it is assumed that the UE 302 uses a wide beam 304 which may be used for both signal transmission and reception. It is the shape of the beam 304 which leads to the type of grid search (or grid scan). That is, by using the beam 304, the 3D scan may happen on a sparser grid 306. In FIG. 3B, it is assumed that the UE 302 uses a narrow beam 308, and the 3D scan happens on a fine grid 310. One scan strategy would be that an initial search (e.g., for the minimum EIS) starts with the wide beams 304, and once it is finished, the 3D scan continues in its vicinity with a finer granularity (i.e. by using the narrow beams 308). This is however not the only way in which the 3D scan may be performed. For example, the narrow beams 308 may be used from the very beginning of the 3D scan, but at the expense of increased latency (and likely power consumption). Similar to finding the best UE receive beam (i.e. with the peak power), the best UE transmit beam is found where the maximum EIRP is measured, and this complementary operation should be performed by a network node (e.g., gNB) (not shown in FIGS. 3A and 3B) which serves the UE 302.

The whole concept of the spherical coverage of UEs is meant so far for device testing capability and has no other meaning in the radio operation of wireless communication systems. Recent developments in algorithm operation and in hardware facilitate more the utilization of antenna parameter prediction, which is part of machine learning (ML)/artificial intelligence (AI) algorithms. However, there is still a lack of prior art solutions that would involve using the ML/AI algorithms and the spherical coverage of UEs in beamforming (e.g., for reference signals).

The example embodiments disclosed herein provide a technical solution that allows mitigating or even eliminating the above-sounded drawbacks peculiar to the prior art. In particular, the technical solution disclosed herein involves applying a spatial quantization to a spherical coverage of a UE, as well as using the spatially quantized spherical coverage in a beamforming process on the side of a network node. To this end, the UE transmits, to the network node, UE location information and antenna parameter measurements which are taken at least one time in at least one spatial section of the spatially quantized spherical coverage. In response to the UE location information and the antenna parameter measurements, the network node obtains a signal model. The signal model may be obtained by using a data processing algorithm, e.g., an ML algorithm. The signal model is indicative of how reference signals are to be transmitted from the network node to the UE. By so doing, it is possible to optimize the transmission of reference signals from the network node to the UE, since the network node knows which of the spatial sectors of the spatially quantized spherical coverage of the UE is most suitable for their reception.

It should be noted that the term "spatial sector" used in the embodiments disclosed herein refers to a radio environment of a UE. For example, the radio environment which is along a road may be characterized by spatial sectors which various resolutions, like every 5 meters the network node may want to know how the UE "sees" the radio environment in 3D (spatial sectors). Then, the network node collects all the UE location information and the antenna parameter measurements and obtains the full picture of the radio environment along that road. When this is done, the network node may optimize how the reference signals are transmitted along this road. This road scenario may be generalized to the whole space.

Figure 4:
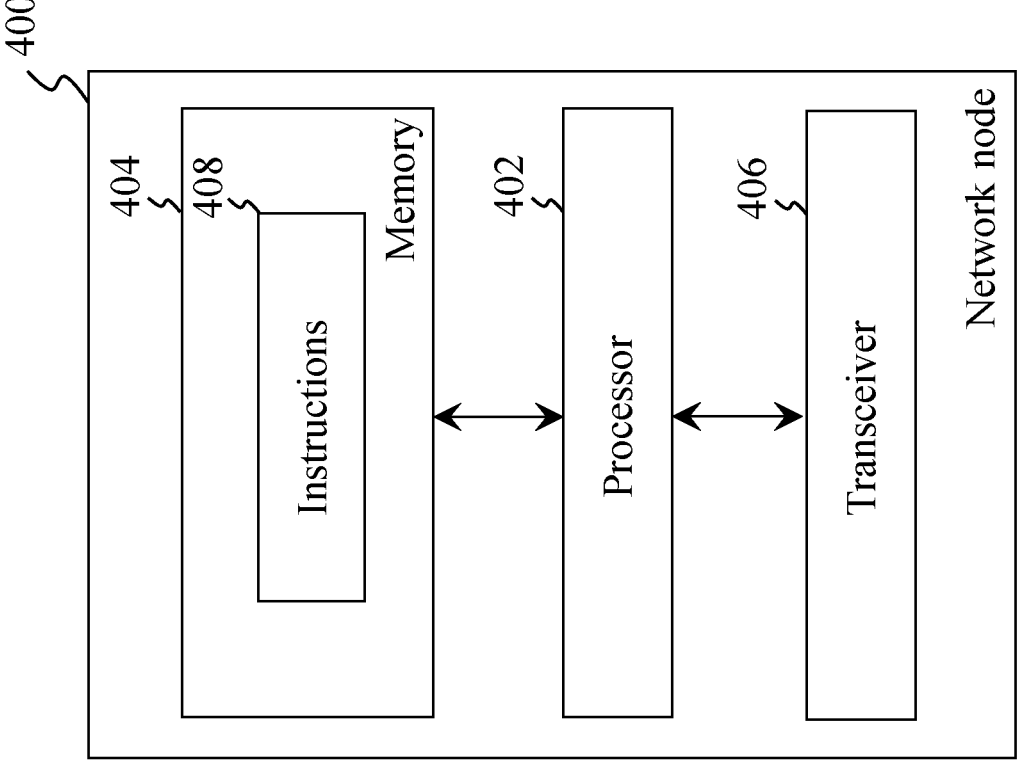
FIG. 4 shows a general block-scheme of a network node in accordance with one example embodiment.

FIG. 4 shows a general block-scheme of a network node 400 in accordance with one example embodiment. The network node 400 is intended to be deployed in any of the above-described wireless communication networks. As shown in FIG. 4, the network node 400 comprises a processor 402, a memory 404, and a transceiver 406. The memory 404 stores processor-executable instructions 408 which, when executed by the processor 402, cause the processor 402 to implement the aspect of the present disclosure, as will be described below in more detail. It should be noted that the number, arrangement and interconnection of the constructive elements constituting the network node 400, which are shown in FIG. 4, are not intended to be any limitation of the present disclosure, but merely used to provide a general idea of how the constructive elements may be implemented within the network node 400. For example, the processor 402 may be replaced with several processors, as well as the memory 404 may be replaced with several removable and/or fixed storage devices, depending on particular applications. Furthermore, the transceiver 406 may be implemented as two individual devices, with one for a receiving operation and another for a transmitting operation. Irrespective of its implementation, the transceiver 406 is intended to be capable of performing different operations required to perform the data reception and transmission, such, for example, as signal modulation/demodulation, encoding/decoding, etc.

The processor 402 may be implemented as a CPU, general-purpose processor, single-purpose processor, microcontroller, microprocessor, application specific integrated circuit (ASIC), field programmable gate array (FPGA), digital signal processor (DSP), complex programmable logic device, etc. It should be also noted that the processor 402 may be implemented as any combination of one or more of the aforesaid. As an example, the processor 402 may be a combination of two or more microprocessors.

The memory 404 may be implemented as a classical nonvolatile or volatile memory used in the modern electronic computing machines. As an example, the nonvolatile memory may include Read-Only Memory (ROM), ferroelectric Random-Access Memory (RAM), Programmable ROM (PROM), Electrically Erasable PROM (EEPROM), solid state drive (SSD), flash memory, magnetic disk storage (such as hard drives and magnetic tapes), optical disc storage (such as CD, DVD and Blu-ray discs), etc. As for the volatile memory, examples thereof include Dynamic RAM, Synchronous DRAM (SDRAM), Double Data Rate SDRAM (DDR SDRAM), Static RAM, etc.

The processor-executable instructions 408 stored in the memory 404 may be configured as a computer-executable code which causes the processor 402 to perform the aspects of the present disclosure. The computer-executable code for carrying out operations or steps for the aspects of the present disclosure may be written in any combination of one or more programming languages, such as Java, C++, or the like. In some examples, the computer-executable code may be in the form of a high-level language or in a pre-compiled form and be generated by an interpreter (also pre-stored in the memory 404) on the fly.

FIG. 5 shows a flowchart of a method 500 for operating the network node 400 in accordance with one example embodiment. In the method 500, the network node 400 is intended to communicate with at least one UE present in a wireless communication network. The wireless communication network may, for example, operate based on the mmWaves. The method 500 starts with a step S502, in which the processor 402 causes the transceiver 406 to transmit, to the UE, a spatial resolution to be used for a spherical coverage (like the spherical coverage 100) of an antenna of the UE. The spatial resolution is indicative of a set of spatial sectors into which the spherical coverage of the antenna of the UE is to be divided. Next, the method 500 proceeds to a step S504, in which the processor 402 causes the transceiver 406 to receive, from the UE, a response message which comprises UE location information and an antenna parameter of the antenna of the UE. The antenna parameter is measured one or more times in one or more spatial sectors of the set of spatial sectors. The antenna parameter should be construed as covering different radio parameters, such, for example, as an EIRP, an EIS, a PDP, an AoA estimation, a reference signal index, a CSI representation of a measured wireless channel (the term CSI should be construed as encompassing a precoding matrix indicator (PMI), a channel quality indicator (CQI), etc.), a SINR, any combination thereof, or be represented by any other parameters that allow one to characterize the spherical coverage of the UE (e.g., in terms of radiated power). Further, the method 500 goes on to a step S506, in which the processor 402 obtains a signal model based on the response message. To make the signal model more suitable and accurate for the UE, the processor 402 may additionally use a special data processing algorithm, such, for example, as a ML algorithm. The ML algorithm may use a NN, decision tree, linear regression, logistic regression, etc. The ML algorithm may be also represented by any combination of different ML algorithms. The ML algorithm may also be based on supervised learning, unsupervised learning, deep learning, reinforcement learning, federated learning. In general, the selection of the ML algorithm depends on particular application and, in particular, requirements for time and computational costs. As for the signal model obtained in the step S506 of the method 500, it is indicative of how at least one reference signal is to be transmitted by the network node 400 to the UE. The at least one reference signal may be represented by one or more signal used by the UE, for example, to establish a full connection (e.g., RRC_CONNECTED) with the network node 400. Non-restrictive examples of the reference signals may include demodulation reference signals and sounding reference signals. The method 500 ends with a step S508, in which the processor 402 causes the transceiver 406 to transmit the signal model to the UE.

In one embodiment, the signal model may be indicative of a geographical area in which the at least one reference signal is to be transmitted by the transceiver. This embodiment may be used in case of a rural or urban environment where the UE is going to be active for an upcoming period of time, in a more static way or move with pedestrian speeds. In this sense, the signal model may be called a static signal model.

In another embodiment, the signal model may be indicative of a set of successive spatial positions of the UE along which the at least one reference signal is to be transmitted by the transceiver. This embodiment may be used, for example, when the UE is in a high-speed train, or on a motorway, or in areas which are more predictable in terms of the UE directivity based on the UE speed. In this sense, the signal model may be called a dynamic signal model.

In yet another embodiment, if the at least one reference signal comprises a first reference signal and a second reference signal, the signal model may be indicative of: (i) a set of successive spatial positions of the UE along which the first reference signal is to be transmitted by the transceiver, and (ii) a geographical area in which the second reference signal is to be transmitted by the transceiver. In other words, the network node 400 may use the combination of the static and dynamic signal models for the UE. The selection of a certain signal model may depend on the result of the ML algorithm.

In one embodiment, the processor 402 may define the spatial resolution based on a UE positioning accuracy used in the wireless communication network. This may allow obtaining the most suitable spatial sectors in the spherical coverage of the UE. Moreover, the spatial resolution transmitted from the network node 400 to the UE may be dynamical or semi-statical in the sense that the spatial sectors of the spherical coverage of the UE (or, in other words, the spatial quantization) may change according to a certain rule. For example, the spatial sectors may change depending on a geographical area where the UE is going to move, and/or the spatial sectors may be valid only for a certain period of time, upon the expiry of which they should be replaced with other ones (e.g., those which had been in force before the network node 400 transmitted the spatial quantization to the UE).

In one embodiment, the method 500 may comprise an additional step (e.g., after the step S508 or before the step S506), in which the processor 402 causes the transceiver 406 to transmit, to the UE, a request for re-measuring or updating the antenna parameter in one or more spatial sectors of the set of spatial sectors. This may be useful, for example, when there are areas where no information is available at the network node 400, or sufficient information is available to the network node 400. By transmitting such a request one or more times to the UE, the network node 400 may correctly schedule the UE measurements and feedback.

In one embodiment, the method 500 may comprise an additional step (e.g., before the step S502), in which the processor 402 defines a time unit (slot/subframe) within which the antenna parameter is to be measured and causes the transceiver 406 to transmit the time unit to the UE. By using this time unit, it is possible to reduce undesired signalling in the wireless communication network and, consequently, control UE power consumption.

Figure 6:
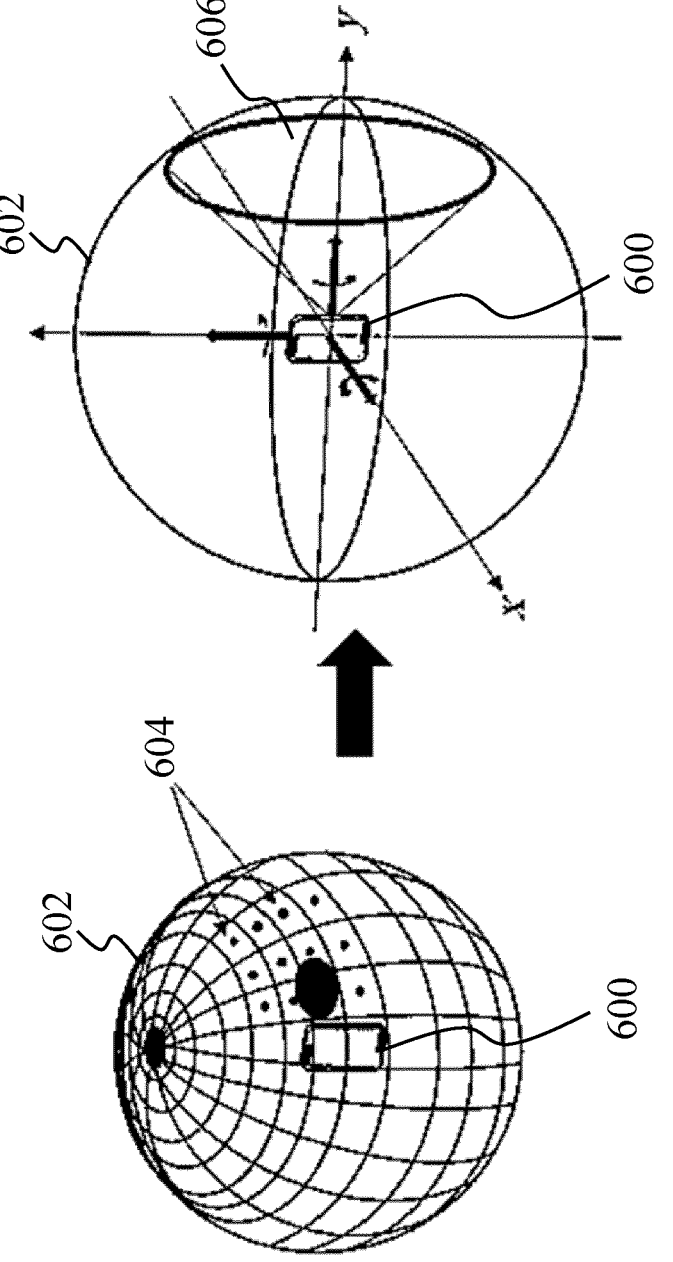
FIG. 6 shows one example of a spatial resolution transmitted by the network node shown in FIG. 4 to a UE.
Figures 7A, 7B, 7C, 7D, 7E, 7F:
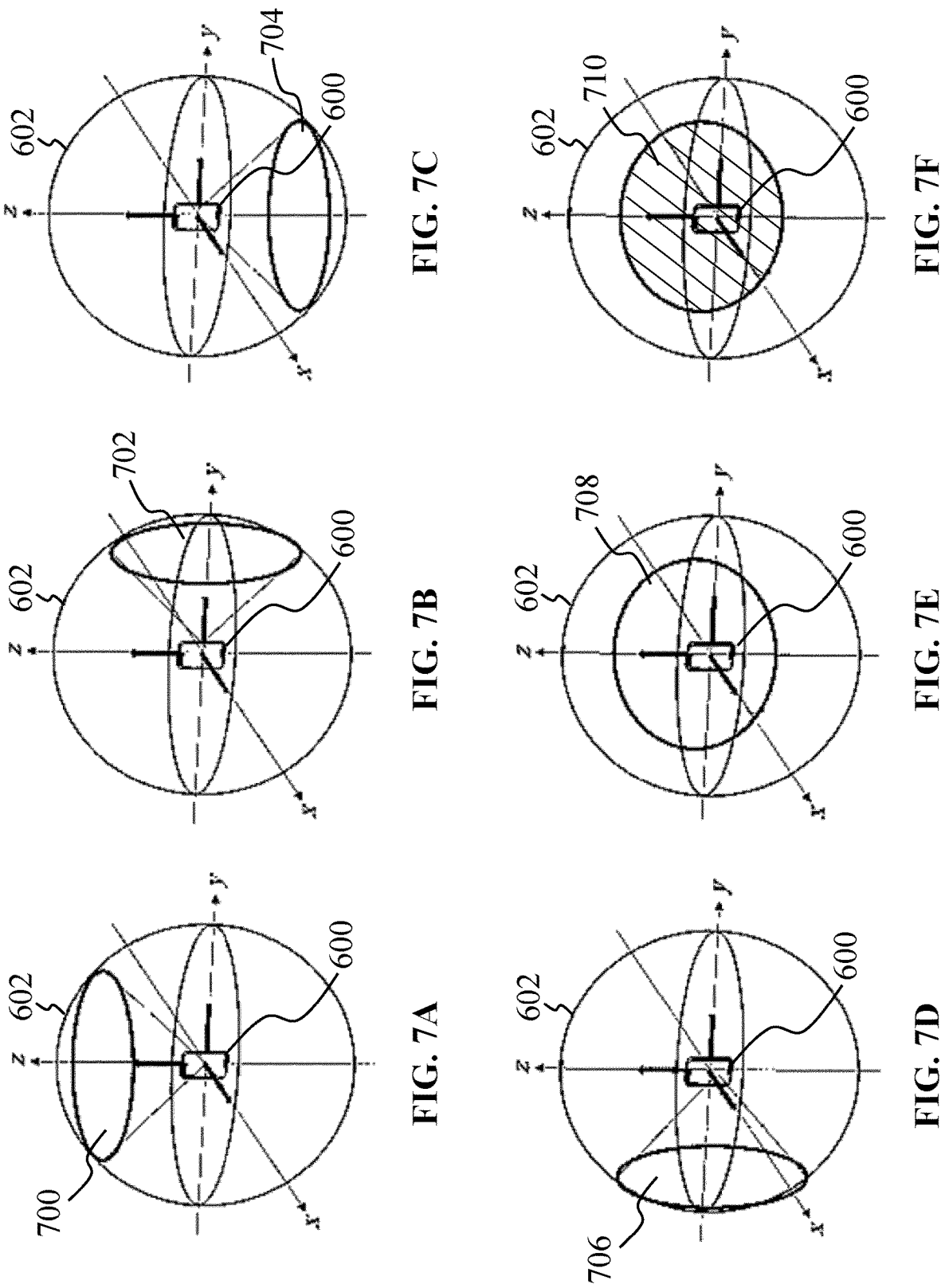
FIGS. 7A-7F shows examples of spatial sectors into which the UE spherical coverage may be divided.

FIG. 6 shows one example of the spatial resolution transmitted by the network node 400 to a UE 600. In particular, it may be done in the step S502 of the method 500. As shown in FIG. 6, the UE 600 has a spherical coverage 602 with coarse grid points 604. It is assumed that the spatial quantization transmitted by the network node 400 to the UE 600 causes the UE 600 to map one part of the coarse grid points 604 to a spatial sector 606. The reception of reference signal(s) in the spatial sector 606 may be performed with one or more receive beams/spatial filters. Having different types of receive beams, wide or narrow, would define different levels of the spatial quantization transmitted by the network node 400. The network node 400 may inform the UE 600 about the spatial resolution it desires to acquire. Signal transmission and reception in the spatial sector 606 may be also performed with narrow beams (e.g., as shown in FIG. 3B). Two types of beams, wide and narrow, may be required for the operation of the UE 600, since some degree of spatial resolution may be required. This may result in, for example, six spatial sectors 700-710 of the spherical coverage, as shown in FIGS. 7A-7F, where each of the spatial sectors 700-710 may be spatially/geographically and temporally mapped. More specifically, FIG. 7A shows an upper spatial sector 700, FIG. 7B shows a right spatial sector 702, FIG. 7C shows a bottom spatial sector 704, FIG. 7D shows a left spatial sector 706, FIG. 7E shows a front spatial sector 708, and FIG. 7F shows a rear spatial sector 710. The UE 600 may have different degrees of capability in terms of performing antenna parameter measurements in these spatial sectors of the spherical coverage, while also it is understood that at some point in time, only one or a very few antenna parameter measurements might be recorded. This is not seen as a problem as said recording is understood as a lengthy process requiring multiple antenna parameter measurements from multiple UEs.

Figure 8:
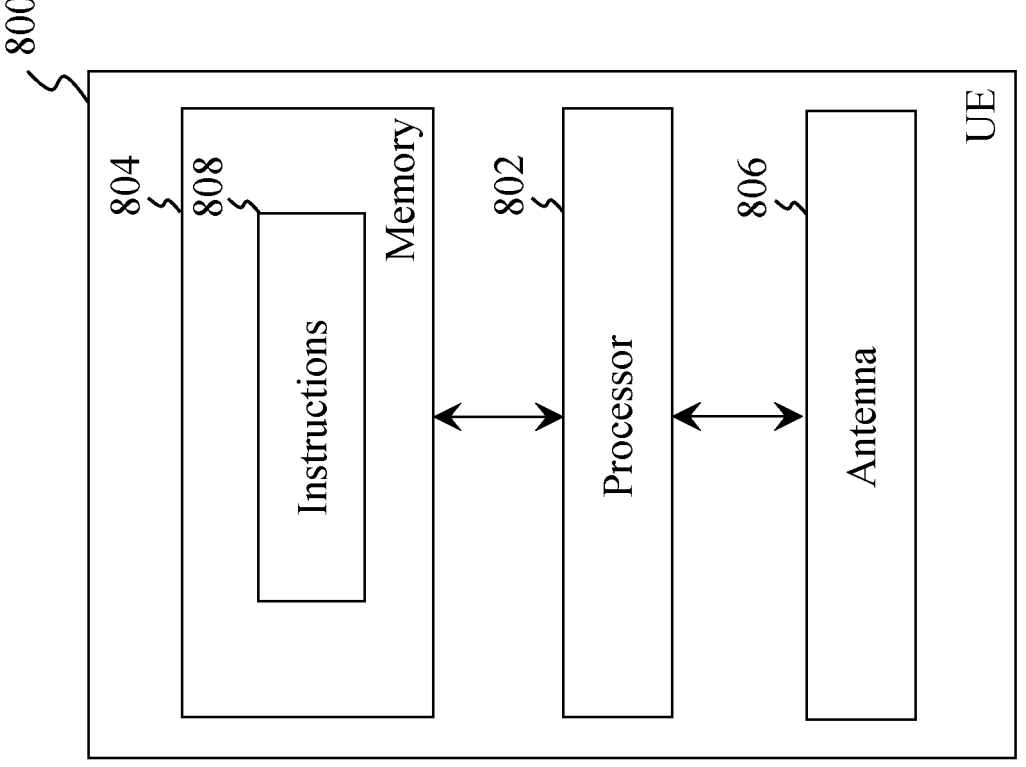
FIG. 8 shows a general block-scheme of a UE in accordance with one example embodiment.

FIG. 8 shows a general block-scheme of a UE 800 in accordance with one example embodiment. The UE 800 is intended to operate in any of the above-described wireless communication networks (e.g., the mmWave-based network). As shown in FIG. 8, the UE 800 comprises a processor 802, a memory 804, and an antenna 806. The memory 804 stores processor-executable instructions 808 which, when executed by the processor 802, cause the processor 802 to implement the aspect of the present disclosure, as will be described below in more detail. It should be again noted that the number, arrangement and interconnection of the constructive elements constituting the UE 800, which are shown in FIG. 8, are not intended to be any limitation of the present disclosure, but merely used to provide a general idea of how the constructive elements may be implemented within the UE 800. For example, the processor 802 may be replaced with several processors, as well as the memory 804 may be replaced with several removable and/or fixed storage devices, depending on particular applications. Furthermore, the antenna 806 may be implemented as two or more antenna arrays, with some used for a receiving operation and other used for a transmitting operation. Moreover, the antenna 806 is assumed to provide the spherical coverage of the UE 800, like the spherical coverage 100 shown in FIG. 1.

In general, the processor 802, the memory 804 and the processor-executable instructions 808 may be implemented in the same or similar manner as the processor 402, the method 404 and the processor-executable instructions 408, respectively.

FIG. 9 shows a flowchart of a method 900 for operating the UE 800 in accordance with one example embodiment. In the method 900, the UE 800 is intended to communicate with the network node 400. The method 900 starts with a step S902, in which the processor 802 causes the antenna 806 to receive, from the network node 400 (i.e. the transceiver 406), the spatial resolution to be used for the spherical coverage of the antenna 806 of the UE 800. It should be noted that the UE 800 may preliminarily inform the network node 400 about its spatial quantization capabilities, so that the UE 800 could implement the spatial resolution transmitted by the network node 400. The spatial quantization capabilities may imply a maximum number of spatial sectors into which the UE 800 (i.e. the processor 802) may divide the spherical coverage. Next, the method 900 proceeds to a step S904, in which the processor 802 divides the spherical coverage of the antenna 806 into the set of spatial sectors. Further, the method 900 goes on to a step S906, in which the processor 802 measures one or more times the antenna parameter (e.g. an EIRP, EIS, or their combination) of the antenna 806 in one or more spatial sector of the set of spatial sectors. After that, the method 900 proceeds to a step S908, in which the processor 802 causes the antenna 806 to transmit the response message comprising the UE location information and the antenna parameter to the network node 400 (i.e. the transceiver 406). The processor 802 causes the antenna 806 to receive a signal model from the network node 400 in a next step S910. The signal model may be one of those discussed above in respect of the method 500.

In one embodiment, the method 900 may comprise an additional step, in which the processor 802 causes the antenna 806 to receive, from the network node 400, the request for re-measuring or updating the antenna parameter in one or more spatial sectors of the set of spatial sectors. In response to the request, the processor 802 updates the antenna parameter in the one or more spatial sectors and causes the antenna 806 to transmit the updated antenna parameter to the network node 400.

In one embodiment, the method 900 may comprise an additional step, in which the processor 802 causes the antenna 806 to receive, from the network node 400, a time unit within which the antenna parameter is to be measured. This may also allow the UE 800 to correctly schedule its measurements and feedback. Moreover, knowing when the measurements are to be taken, the UE 800 may reduce its signalling in the wireless communication network and, consequently, its power consumption.

Figure 10:
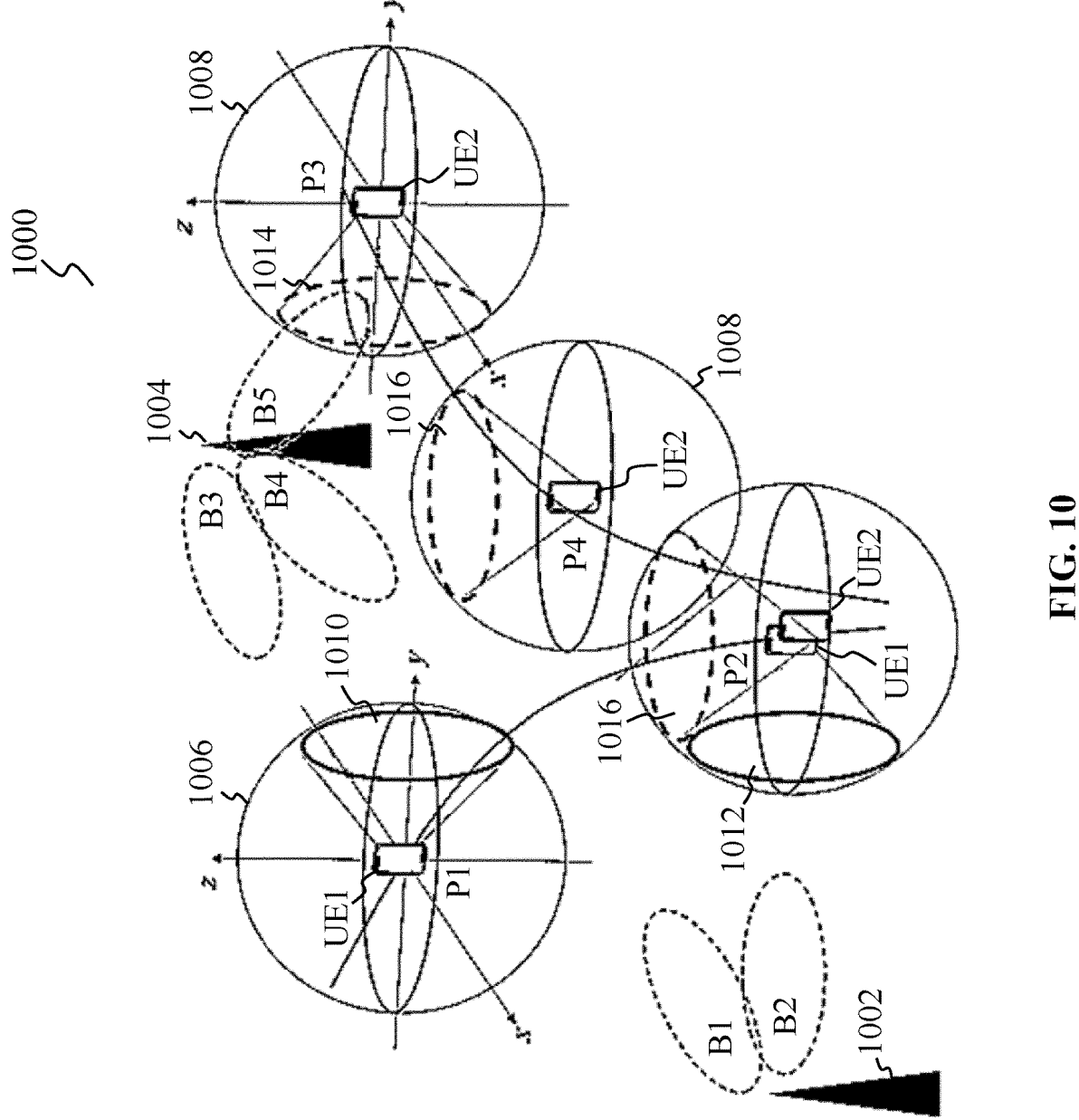
FIG. 10 shows a block-scheme of a wireless communication system in one example embodiment.

FIG. 10 shows a block diagram of a wireless communication system 1000 in accordance with one example embodiment. More specifically, the system 1000 comprises two UEs UE1 and UE2 and two network nodes 1002 and 1004. The UE1 and the UE2 are assumed to move across the network nodes 1002 and 1004. Each of the UE1 and the UE2 may be implemented in the same manner as the UE 800, while each of the network nodes 1002 and 1004 may be implemented in the same manner as the network node 400. The UE1 has a spherical coverage 1006, and the UE2 has a spherical coverage 1008. The network node 1002 is assumed to emit two beams B1 and B2, while the network node 1004 is assumed to emit two beams B3, B4 and B5. By using the beams B1-B5, the network nodes 1002 and 1004 may, for example, transmit reference signals to the UE1 and the UE2. Each of the UE1 and the UE2 uses different receive/transmit beams which are mapped to a corresponding spatial sector in the spherical coverage (it is already implied that the spatial quantization of the spherical coverage of each of the UE1 and the UE2 is somehow performed). In the system 1000, the UE1 would be able to receive in position P1, in a spatial sector 1010, reference signals coming from the network node 1004 over the beams B3 and B4, while in position P2, in a spatial sector 1012, reference signals coming from the network node 1002 over the beam B2 and, possibly, the beam B1. The UE2 is assumed to move from a position P3 to a position P4 and further also reach the position P2. In the position P3, the UE2 may receive, in a spatial sector 1014, the reference signals coming from the network node 1004 over the beam B5, while in the position P4, in a spatial sector 1016, the reference signals coming from the network node 1004 over the beam B4. The same spatial sector 1016 may be then used by the UE2 in the position P2 to receive, for example, the reference signals coming from the network node 1004 over the beam B4. Thus, the same position P2 is tagged now with two spatial sector measurements (i.e. the spatial sector 1012 of the spherical coverage 1006 of the UE1 and the spatial sector 1016 of the spherical coverage

1008 of the UE2), which are made by the UE1 and the UE2. In other words, the UE1 and the UE2 may record different incoming reference signals in different spatial sectors, if, for example, they are equipped with different antenna array capabilities. It should be also noted that the spatial location of the UE1 and the UE2 is defined on a spatial/geographical grid defined with some spatial resolution. This may also be linked with the UE positioning accuracy used in the system 100. For example, if the location of the UE1 and the UE2 is required to be known with a resolution of 1 m, then this may be also a spatial resolution grid for performing the spatial quantization of the spherical coverages 1006 and 1008.

An example of how the antenna parameter measurements and their characteristics may be recorded by the UE1 (or the UE2) is shown in Table 1 given below. It is well-known that any UE is exposed to sudden rotation and/or blockage. This may affect the antenna parameter measurements. However, the UE1 (or the UE2) may transmit the antenna parameter measurements performed under blockage or other UE event, and a particular indication of such an event may be also transmitted to the network node 1002 or 1004. It should be also noted that, in Table 1, "RSRP/SINR" stands for "Reference Signal Received Power/Signal Interference Noise Ratio", which may be also used as one antenna parameter.

TABLE 1

| | | measurements for UE1 at position P1 | | |
|---|---|---|---|---|
| Measure-ment no. | RSRP/ SINR of reference signal | Reference signal identity | Spatial/temporal location | UE event (blockage) |
| 1 | <value> | Spatial Sector 1-RS A from node1 | <coordinates, time stamp> | <yes, no> |
| 2 | <value> | Spatial Sector 1-RS B from node1 | <coordinates, time stamp> | <yes, no> |

Figure 11:
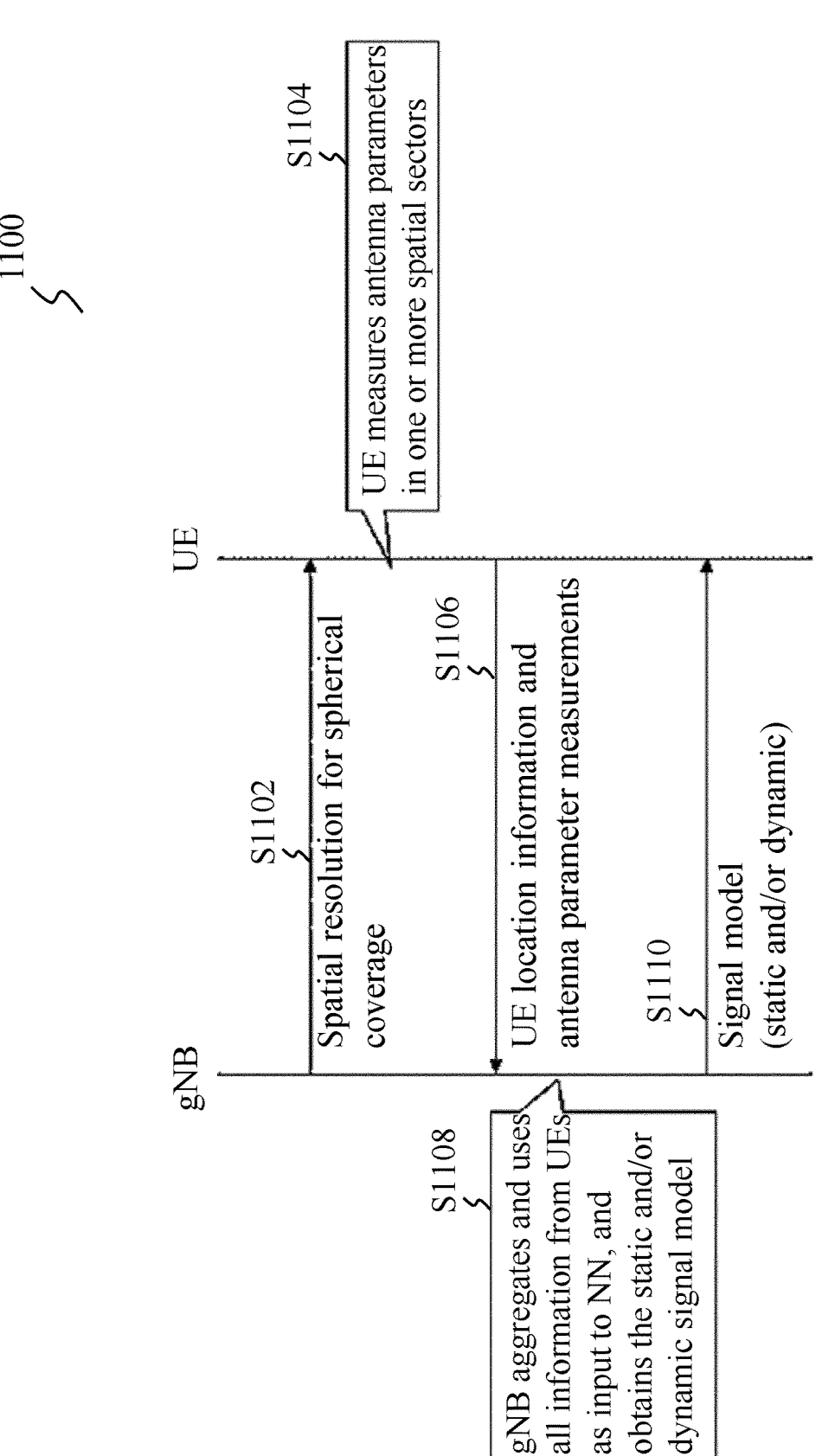
FIG. 11 shows an interaction diagram that explains the interaction between a network node and a UE in accordance with one example embodiment.

FIG. 11 shows an interaction diagram 1100 that explains the interaction between a network node and a UE in accordance with one example embodiment. In this embodiment, it is implied that the network node is a gNB, and it may be implemented in the same manner as the network node 400. The UE is implied to be implemented as the UE 800. The interaction diagram 1100 starts with a step S1102, in which the gNB transmit the spatial quantization for the spherical coverage to the UE. By using the spatial quantization, the UE divides its spherical coverage into the set of spatial sectors, like the ones shown in FIGS. 7A-7F, for example. Further, the interaction diagram 1100 proceeds to a step S1104, in which the UE takes antenna parameter measurements. For example, these measurements may be performed based on control signals transmitted by the gNB to the UE. Some other ways of the antenna parameter measurements may be also used, if required and depending on particular applications. After that, the interaction diagram 1100 goes on to a step S1106, in which the UE transmits the measured antenna parameter(s) and its location information to the gNB. In a next step S1108, the gNB uses the UE location information and the antenna parameters as input data to a NN (which is one example of the ML algorithm). It should be noted that the gNB may serve multiple UEs in parallel. In this case, the gNB may aggregate the UE location information and the measured antenna parameters from the multiple UEs and use all of them as the input data to the NN. The NN should configured such that its output is a selection of one of the static and dynamic signal models, or their combination. The interaction diagram 1100 further proceeds to a step S1110, in which the gNB transmits the selected signal model to the UE. This signal model may be then used by the UE to understand when to be ready for the reception of the reference signals from the gNB. The signal model may also comprise reference signal indices and their utilization/ measurement in time by the UE.

It should be noted that each step or operation of the methods 500, 900 and the interaction diagram 1100, or any combinations of the steps or operations, can be implemented by various means, such as hardware, firmware, and/or software. As an example, one or more of the steps or operations described above can be embodied by processor executable instructions, data structures, program modules, and other suitable data representations. Furthermore, the processor-executable instructions which embody the steps or operations described above can be stored on a corresponding data carrier and executed by the processors 402 and 802. This data carrier can be implemented as any computer-readable storage medium configured to be readable by said at least one processor to execute the processor executable instructions. Such computer-readable storage media can include both volatile and nonvolatile media, removable and non-removable media. By way of example, and not limitation, the computer-readable media comprise media implemented in any method or technology suitable for storing information. In more detail, the practical examples of the computer-readable media include, but are not limited to information-delivery media, RAM, ROM, EEPROM, flash memory or other memory technology, CD-ROM, digital versatile discs (DVD), holographic media or other optical disc storage, magnetic tape, magnetic cassettes, magnetic disk storage, and other magnetic storage devices.

Although the example embodiments of the present disclosure are described herein, it should be noted that any various changes and modifications could be made in the embodiments of the present disclosure, without departing from the scope of legal protection which is defined by the appended claims. In the appended claims, the word "comprising" does not exclude other elements or operations, and the indefinite article "a" or "an" does not exclude a plurality. The mere fact that certain measures are recited in mutually different dependent claims does not indicate that a combination of these measures cannot be used to advantage.

The invention claimed is:

1. A network node in a wireless communication network, comprising:
 a processor;
 a memory coupled to the processor and configured to store processor-executable instructions; and
 a transceiver coupled to the processor;
 wherein the processor is configured, when executing the processor-executable instructions, to:
 cause the transceiver to receive preliminary information from a user equipment (UE), the preliminary information being indicative of a maximum number of spatial sectors into which the UE is configured to divide a spherical coverage of an antenna of the UE;
 based on the preliminary information, define a spatial resolution to be transmitted to the UE;
 cause the transceiver to transmit, to the UE the spatial resolution to be used for the spherical coverage of the antenna of the UE, the spatial resolution being indicative of a set of spatial sectors into which the spherical coverage of the antenna of the UE is to be divided;
 cause the transceiver to receive a response message from the UE, the response message comprising location information of the UE and an antenna parameter of the antenna of the UE, the antenna parameter being measured at the UE at least one time in at least one spatial sector of the set of spatial sectors;
 obtain a signal model based on the response message, the signal model being indicative of how at least one reference signal is to be transmitted by the transceiver to the UE; and
 cause the transceiver to transmit the signal model to the UE.

2. The network node of claim 1, wherein the processor is further configured to define the spatial resolution based on a UE positioning accuracy used in the wireless communication network.

3. The network node of claim 1, wherein the antenna parameter comprises at least one of an effective isotropic radiated power, an effective isotropic sensitivity, a reference signal received power, a power delay profile, an angle of arrival estimation, a reference signal index, a channel state information representation of a wireless communication channel established between the UE and the network node, and a signal interference noise ratio.

4. The network node of claim 1, wherein the processor is further configured to:
 cause the transceiver to transmit, to the UE, a request for updating the antenna parameter in the at least one spatial sector of the set of spatial sectors; and
 cause the transceiver to receive the updated antenna parameter from the UE.

5. The network node of claim 1, wherein the processor is further configured to:
 define a time unit within which the antenna parameter is to be measured; and
 cause the transceiver to transmit the time unit to the UE.

6. The network node of claim 1, wherein the signal model is indicative of:
 a geographical area in which the at least one reference signal is to be transmitted by the transceiver, or
 a set of successive spatial positions of the UE along which the at least one reference signal is to be transmitted by the transceiver.

7. The network node of claim 1, wherein the at least one reference signal comprises a first reference signal and a second reference signal.

8. The network node of claim 1, wherein the spatial resolution is further indicative of:
 a condition for changing the set of spatial sectors depending on a geographical area where the UE is going to enter, or
 a time period within which the set of spatial sectors is valid.

9. The network node of claim 1, wherein the processor is configured to obtain the signal model based on a machine learning algorithm.

10. A user equipment (UE) for wireless communications, comprising:
 a processor;
 a memory coupled to the processor and configured to store processor-executable instructions; and
 an antenna coupled to the processor and configured to provide a spherical coverage around the UE;
 wherein the processor is configured, when executing the processor-executable instructions, to:
 cause the antenna to transmit preliminary information to a network node, the preliminary information being indicative of a maximum number of spatial sectors into which the UE is configured to divide a spherical coverage of the antenna;

cause the antenna to receive, from the network node, a spatial resolution to be used for the spherical coverage of the antenna, the spatial resolution being indicative of a set of spatial sectors into which the spherical coverage of the antenna is to be divided;

divide the spherical coverage of the antenna into the set of spatial sectors;

measure an antenna parameter of the antenna at least one time in at least one spatial sector of the set of spatial sectors;

cause the antenna to transmit a response message to the network node, the response message comprising location information of the UE and the antenna parameter; and cause the antenna to receive a signal model from the network node, the signal model being indicative of how at least one reference signal is to be transmitted by the network node to the UE.

11. The UE of claim 10, wherein the antenna parameter comprises at least one of an effective isotropic radiated power, an effective isotropic sensitivity, a reference signal received power, a power delay profile, an angle of arrival estimation, a reference signal index, a channel state information representation of a wireless communication channel established between the UE and the network node, and a signal interference noise ratio.

12. The UE of claim 10, wherein the processor is further configured to:

cause the antenna to receive, from the network node, a request for updating the antenna parameter in one or more spatial sectors of the set of spatial sectors;

in response to the request, update the antenna parameter in the one or more spatial sectors; and cause the antenna to transmit the updated antenna parameter to the network node.

13. The UE of claim 10, wherein the processor is further configured to cause the antenna to receive, from the network node, a time unit within which the antenna parameter is to be measured.

14. The UE of claim 10, wherein the signal model is indicative of: a geographical area in which the at least one reference signal is to be transmitted by the network node, or a set of successive spatial positions of the UE along which the at least one reference signal is to be transmitted by the network node.

15. The UE of claim 10, wherein the at least one reference signal comprises a first reference signal and a second reference signal.

16. The UE of claim 10, wherein the spatial resolution is further indicative of: a condition for changing the set of spatial sectors depending on a geographical area where the UE is going to enter, or a time period within which the set of spatial sectors is valid.

17. A method for operating a user equipment (UE) for wireless communications, comprising:

transmitting preliminary information to a network node, the preliminary information being indicative of a maximum number of spatial sectors into which the UE is configured to divide a spherical coverage of the antenna;

receiving, from the network node, a spatial resolution to be used for the spherical coverage of the antenna of the UE, the spatial resolution being indicative of a set of spatial sectors into which the spherical coverage of the antenna is to be divided;

dividing the spherical coverage of the antenna into the set of spatial sectors;

measuring an antenna parameter of the antenna at least one time in at least one spatial sector of the set of spatial sectors;

transmitting a response message to the network node, the response message comprising location information of the UE and the antenna parameter; and receiving a signal model from the network node, the signal model being indicative of how at least one reference signal is to be transmitted by the network node to the UE.

18. The method of claim 17, wherein the antenna parameter comprises at least one of an effective isotropic radiated power, an effective isotropic sensitivity, a reference signal received power, a power delay profile, an angle of arrival estimation, a reference signal index, a channel state information representation of a wireless communication channel established between the UE and the network node, and a signal interference noise ratio.

19. The method of claim 17, further comprising:

receiving, from the network node, a request for updating the antenna parameter in one or more spatial sectors of the set of spatial sectors;

in response to the request, updating the antenna parameter in the one or more spatial sectors; and transmitting the updated antenna parameter to the network node.

20. The method of claim 17, further comprising:

receiving, from the network node, a time unit within which the antenna parameter is to be measured.

* * * * *